United States Patent [19]

McCauley

[11] Patent Number: 6,129,833
[45] Date of Patent: Oct. 10, 2000

[54] CATALYTIC CRACKING WITH REDUCED EMISSION OF SULFUR OXIDES

[75] Inventor: John R. McCauley, Louisville, Md.

[73] Assignee: Tricat Industries, Inc., Hunt Valley, Md.

[21] Appl. No.: 09/124,227

[22] Filed: Jul. 29, 1998

Related U.S. Application Data

[63] Continuation-in-part of application No. 08/874,888, Jun. 13, 1997, Pat. No. 5,990,030.
[60] Provisional application No. 60/055,096, Aug. 6, 1997.
[51] Int. Cl.$^7$ .................................................... C10G 11/00
[52] U.S. Cl. ...................... 208/113; 208/121; 208/120.15; 208/120.2; 208/120.25; 208/120.01; 208/299; 208/305; 208/306; 208/226; 208/245; 208/246; 208/58
[58] Field of Search .............................. 208/58, 113, 121, 208/120.15, 120.2, 120.25, 120.01, 299, 305, 306, 226, 245, 246

[56] References Cited

U.S. PATENT DOCUMENTS

| | | | |
|---|---|---|---|
| 4,153,534 | 5/1979 | Vasalos | 208/120 |
| 4,243,556 | 1/1981 | Blanton, Jr. | 252/455 Z |
| 4,252,635 | 2/1981 | Blanton, Jr. | 208/114 |
| 4,609,539 | 9/1986 | Horecky et al. | 423/244 |
| 4,692,318 | 9/1987 | Tolpin et al. | 423/239 |
| 5,095,166 | 3/1992 | Forschner et al. | 585/653 |
| 5,399,327 | 3/1995 | Kim | 423/244.11 |
| 5,422,332 | 6/1995 | Demmel | 502/414 |
| 5,458,861 | 10/1995 | Buchanan et al. | 423/244.1 |
| 5,547,648 | 8/1996 | Buchanan et al. | 423/210 |
| 5,728,358 | 3/1998 | Avidan et al. | 423/244.01 |
| 5,741,469 | 4/1998 | Bhore et al. | 423/244.01 |

*Primary Examiner*—Walter D. Griffin
*Assistant Examiner*—Nadine Preisch
*Attorney, Agent, or Firm*—McDermott, Will & Emery

[57] ABSTRACT

Sulfur oxides are removed in the regenerator zone and rapidly released as $H_2S$ in the reactor zone of an FCC system employing a particulate $SO_x$ catalytic/absorbent comprising Cu and an alkali metal oxide. Embodiments include the use of an inorganic support, such as alumina or an EC.

11 Claims, No Drawings

CATALYTIC CRACKING WITH REDUCED EMISSION OF SULFUR OXIDES

RELATED APPLICATIONS

This application claims priority from provisional patent application Serial No. 60/055,096, filed on Aug. 6, 1997, entitled "CATALYTIC CRACKING WITH REDUCED EMISSION OF SULFUR OXIDES," the entire disclosure of which is incorporated by reference herein. This application is a continuation-in-part of copending U.S. patent application Ser. No. 08/874,888, filed Jun. 13, 1997, now Pat. No. 5,990,030 the entire disclosure of which is incorporated by reference herein.

TECHNICAL FIELD

The present invention relates to a catalytic absorbent for sulfur oxides. The invention has particular applicability in reducing the emission of sulfur oxides during fluidized catalytic cracking of sulfur-containing hydrocarbon feedstocks.

BACKGROUND ART

A major industrial challenge comprises the development of efficient methods for reducing the concentration of air pollutants, such as sulfur oxides, in waste gases, such as waste gases resulting from the processing and combustion of sulfur-containing hydrocarbon fuels. The discharge of these waste gas streams into the atmosphere is environmentally undesirable at the sulfur oxide concentrations which are frequently encountered in conventional operations. Such waste gas streams typically result, for example, from the combustion of sulfur-containing fossil fuels for the generation of heat and power, the regeneration of catalysts employed in the refining of hydrocarbon feedstocks which contain organic sulfur compounds, and the operation of Claus-type sulfur recovery units.

Two fundamental approaches have been suggested for the removal of sulfur oxides ($SO_x$) from a waste gas. One approach involves scrubbing the waste gas with an inexpensive alkaline material, such as lime or limestone, which reacts chemically with the $SO_x$, yielding a non-volatile product for disposal. Unfortunately, this approach requires a large and continual supply of the alkaline scrubbing material, and the resulting reaction products can create a solid waste disposal problem of substantial magnitude. The second principal approach to the control of $SO_x$ emission involves the use of $SO_x$ absorbents which can be regenerated either thermally or chemically.

Numerous materials have been proposed for use in removing $SO_x$ from gases. For example, Bertolacini et al., U.S. Pat. No. 3,835,031, disclose the use of a crystalline aluminosilicate cracking catalyst impregnated with a Group IIA metal compound or mixture thereof as an oxide or oxides, inclusive of magnesium oxide or magnesia (MgO), for reduced $SO_x$ emission in the regenerator stack gases.

De'Souza et al., U.S. Pat. No. 4,233,276, disclose a method for removing oxidizable sulfur compounds from a waste gas utilizing a metal oxide absorbent, inclusive of sodium, potassium, lithium, magnesium, calcium, strontium, barium, scandium, titanium, chromium, iron, molybdenum, manganese, cobalt, nickel, antimony, copper, zinc, cadmium, lead and rare earth metals, and further inclusive of oxidation promoters such as ruthenium, osmium, rhodium, silver, iridium, palladium, platinum, vanadium and molybdenum.

Bertolacini et al., U.S. Pat. No. 4,369,130, disclose a fluidized catalytic cracking (FCC) catalyst in combination with an absorbent rare earth metal compound and an inorganic oxide, such as an oxide of aluminum, magnesium, zinc, titanium and calcium. The disclosed absorbent can be circulated through an FCC system together with the hydrocarbon cracking catalyst to reduce $SO_x$ emissions from the regenerator zone.

Bertolacini et al., U.S. Pat. No. 4,381,991, disclose a process for removing $SO_x$ from a gas using an absorbent comprising MgO in combination with at least one rare earth metal. The disclosed absorbent can be circulated through an FCC system together with the hydrocarbon cracking catalyst to reduce $SO_x$ emissions from the regenerator zone.

Lewis et al., U.S. Pat. No. 4,626,419, disclose a process for removing $SO_x$ from a mixture of gases utilizing a composite containing a porous refractory support bearing a first component comprising bismuth, chromium or a rare earth metal, such as cerium, and a second component comprising an alkali metal, such as potassium. Burk, Jr. et al., U.S. Pat. No. 4,735,705, disclose an FCC process employing an FCC catalyst in combination with $SO_x$ absorbent particles comprising at least one spinel containing an additive inclusive of an alkali metal, calcium, barium, strontium, beryllium and mixtures thereof. Dai et al., U.S. Pat. No. 5,021,228, disclose the removal of $SO_x$ from gases by contact with a composition comprising alumina containing potassium and thorium. Magnabosco et al., U.S. Pat. No. 5,108,979, disclose the use of spinels to reduce levels of $SO_x$ in the context of an FCC system.

Kim, U.S. Pat. No. 5,288,675, discloses an $SO_x$ gettering composition for use in an FCC system. The disclosed gettering composition comprises an attrition-resistant, coprecipitated magnesia-lanthana-alumina component combined with a catalytic oxidation and/or reducing promoter metal such as ceria, vanadia and/or titania.

Buchanan et al., U.S. Pat. No. 5,547,648, disclose a method of removing $SO_x$ from a combustion flue gas stream emitted from an FCC reactor utilizing an absorbent comprising any of numerous components, such as Group IA metals, Group IIA metals, and Group VIII metals. Magnesium aluminate spinels impregnated with vanadium and cerium are disclosed as particularly useful.

Moore et al., European Patent Application No. EP 0 247 836 A1 disclose an FCC catalyst inventory comprising an FCC catalyst and an $SO_x$ absorbent comprising one or more rare earth metal oxides, particularly lanthanum or cerium, supported on attrition-resistant particles of alumina or a magnesia-alumina spinel. Moore et al. recognize that the limited commercial success of various $SO_x$ additives is due to the exigencies of an FCC system.

The cyclic, FCC of heavy petroleum fractions is one of the major refining operations involved in the conversion of crude petroleum oils to valuable products, such as the fuels utilized in internal combustion engines. A typical FCC unit comprises three sections: a cracking section or reactor; a regenerator and a separation section or stripping zone. A typical FCC process involves continuous catalytically cracking of a petroleum feedstock in a reactor zone through contact with a particulate FCC catalyst at temperatures between about 400° C. and about 700° C. Particulate FCC catalysts substantially deactivated by non-volatile, sulfur-containing coke deposits are separated from the reactor zone effluent and stripped of volatile deposits in a stripping zone. The stripped catalyst particles are separated from the stripping zone effluent, regenerated in a regenerator zone by combustion of the coke with an oxygen-containing gas at temperatures between about 565° C. and about 790° C., and the regenerated catalyst particles returned to the reactor zone. The combustion of sulfurcontaining coke results in the release of substantial amounts of $SO_x$ to the atmosphere.

While numerous materials and composites are known to have absorbent and catalytic properties in connection with $SO_x$ reduction, the formulation of an efficient $SO_x$ reducing additive, e.g., catalyst and/or absorbent, in the context of an FCC system and it exigencies is fraught with problems and unpredictability.

Generally, about 45% to about 55% of the sulfur in the hydrocarbon feedstock is converted to hydrogen sulfide ($H_2S$) in the FCC reactor, about 35% to about 45% remains in a liquid product, and about 5% to about 10% in the coke deposited on the FCC catalyst. These amounts vary depending upon the type of hydrocarbon feedstock, rate of hydrocarbon cycle, steam stripping rate, type of FCC catalyst, reactor temperature, reactor design and other FCC system variables. Accordingly, the formulation of an effective additive for reducing $SO_x$ emissions from an FCC system is recognized in the art as a challenging problem. See the previously mentioned Moore et al., EP 0 247 836 A1; and Bhattacharyya et al., "Catalytic $SO_x$ Abatement: The Role of Magnesium Aluminate Spinel in the Removal of $SO_x$ from Fluid Catalytic Cracking (FCC) Flue Gas," Ind. Eng. Chem. Res. 1988, 27, pp. 1356–1360.

The difficulties attendant upon formulating and designing an effective $SO_x$ reducing additive in the context of an FCC system stems from various requirements and considerations, aside from the generally unpredictable nature of catalytic activity. The particulate material serving as the $SO_x$ reducing additive must be attrition-resistant to survive in an FCC environment without fragmenting. Accordingly, an effective $SO_x$ reducing additive should have a Davison Index less than 10. An effective particulate $SO_x$ reducing additive should not contain any metal or other component which acts as a poison in the FCC regime. In addition, an effective particulate $SO_x$ catalyst/absorbent must perform three functions: (1) oxidize $SO_2$ to $SO_{O3}$; (2) chemisorbs $SO_3$; and (3) release the absorbed $SO_3$ as $H_2S$ in the reactor side of an FCC system. During regeneration, sulfur in the coke is oxidized primarily to $SO_2$. In order for sulfate chemisorption to occur, the $SO_2$ must be oxidized to $SO_3$ which is then chemisorbed as the sulfate. As the operational temperature of the regenerator is increased, the formation of $SO_3$ is less favored. Accordingly, the catalyzing function of an $SO_x$ catalyst/absorbent is significant.

In FCC units operating with high sulfur-containing feedstocks, relatively large amounts of sulfur acceptors having a high unit capacity to adsorb $SO_x$ are required to accomplish reductions in $SO_x$ levels. The use of large amounts of an $SO_x$ reducing additive results in appreciable dilution of the active FCC catalyst in the cracking reaction cycle whether the sulfur acceptor is a part of the FCC particle itself or is present as a discrete entity circulated with the FCC catalyst inventory. A basic limitation is that conditions of time and temperature for operating cyclic, FCC units, especially heat balanced FCC units, are geared to maximizing the production of desired products. Conditions established to achieve this result are by no means those that are optimum for reversibly reacting $SO_x$ in the regenerator zone and carrying the sulfur back to the reactor for conversion at least in part to $H_2S$. Although $SO_x$ reducing additives offer promise, they leave much to be desired because, inter alia, $SO_x$ removal activity decreases rapidly with the residence time available for such $SO_x$ reducing additives to function effectively.

An effective $SO_x$ catalyst/absorbent must be capable of liberating the absorbed sulfur in the form $H_2S$ under conditions prevailing in the reactor portion of an FCC system. Bhattacharyya et al., in the previously mentioned publication, reported the results of experimental testing to determine the feasibility of actually employing various $SO_x$ catalytic/absorbents in an FCC unit. Among the candidates studied were MgO impregnated with ceria ($CeO_2$) for oxidizing $SO_2$ to $SO_3$, and a magnesium aluminate spinel ($Mg_2Al_2O_5$). Vanadium pentoxide ($V_2O_5$) was recognized as an excellent oxidation catalyst for converting $SO_2$ to $SO_3$. However, $V_2O_5$ was shunned because of its expected undesirable reaction with zeolites, the predominant type of FCC catalyst. Accordingly, $CeO_2$ was employed for the oxidation of $SO_2$ to $SO_3$. Another tested catalyst was $CeO_2$ on gamma alumina.

The testing reported by Bhattacharyya et al. reveals that $CeO_2$ in gamma alumina was not a very effective $SO_x$ catalyst/absorbent. $CeO_2$ impregnated MgO was found to be significantly more effective in absorbing $SO_3$ than $CeO_2$ on gamma alumina. However, magnesium sulfate ($MgSO_4$) is extremely stable and, hence, could not be regenerated as efficiently as the $CeO_2$-gamma alumina catalyst/absorbent. Testing revealed that about 27% of absorbed material remained with the $CeO_2$-MgO $SO_x$ catalyst/absorbent, even after 20 minutes of hydrogen reduction, possibly as magnesium sulfide (MgS) or unreduced $MgSO_4$. Bhattacharyya et al. concluded that the rapid deactivation of the $CeO_2$-MgO $SO_x$ catalyst-absorbent is a major reason why it was not considered as a potential $SO_x$ catalyst/absorbent for FCC systems. In addition, MgO lacks the requisite attrition-resistant properties for FCC application, in that it is very soft and breaks down into very fine particles in a short period of time. The unsuitability of MgO as an $SO_x$ catalyst/absorbent in an FCC environment is apparently well known in the art and also reported by Magnabosco et al. in U.S. Pat. No. 5,108,979, wherein the presence of free magnesium oxide is disclosed as undesirable. The experimental testing conducted by Bhattacharyya et al. led to the conclusion that thermally stable magnesium aluminate spinels, such as $MgAl_2O_4$ or $Mg_2Al_2O_5$, were best suited for FCC application. Indeed, a spinel base catalyst, such as that commercialized as magnesium aluminate spinel, is currently recognized as the $SO_x$ catalyst/absorbent of choice for FCC systems. See, for example, U.S. Pat. No. 4,469,589 issued on Sep. 4, 1984 to Yoo et al., U.S. Pat. No. 4,472,267 issued on Sep. 18, 1984 to Yoo et al., U.S. Pat. No. 4,495,304 issued on Jan. 22, 1985 to Yoo et al., and U.S. Pat. No. 4,790,982 issued on Dec. 13, 1988 to Yoo et al., relating to the use of spinels in FCC systems.

There is a continuing need for an effective $SO_x$ reducing additive, e.g., catalyst/absorbent, for use in an FCC system which is capable of converting $SO_2$ to $SO_3$ in the regenerator zone and absorbing large quantities of $SO_3$ in the regenerator zone, given regenerator zone exigencies, including residence time and temperature, and further capable of effectively liberating the absorbed $SO_x$ in the reactor zone, given reactor zone exigencies, including residence time and temperature. There also exists a need to produce such an $SO_x$ catalyst/absorbent in a cost-effective, efficient manner.

DISCLOSURE OF THE INVENTION

An object of the present invention is an $SO_x$ catalyst/absorbent, suitable for use in an FCC system, which can be produced in a cost-effective, efficient manner.

Another object of the present invention is an FCC catalyst inventory comprising an FCC catalyst and an efficient $SO_x$ catalyst/absorbent.

A further object of the present invention is an FCC process employing a catalyst inventory comprising an FCC cracking catalyst and an efficient $SO_x$ catalyst/absorbent.

Additional objects, advantages and other features of the invention will be set forth in part in the description which follows and in part will become apparent to those having ordinary skill in the art upon examination of the following or may be learned from the practice of the invention. The objects and advantages of the invention may be realized and obtained as particularly pointed out in the appended claims.

According to the present invention, the foregoing and other objects are achieved in part by a composition of matter comprising silver (Ag) and/or copper (Cu) and/or alkali metal and an inorganic support.

Another aspect of the present invention is a fluidized catalytic cracking composition comprising a particulate solid cracking catalyst for cracking a hydrocarbon feedstock and sulfur oxide reducing particles comprising Ag and/or Cu and/or alkali metal and an inorganic support.

A further aspect of the present invention is a process for the cyclic fluidized catalytic cracking of a hydrocarbon feedstock containing organic sulfur compounds, which process comprises: cracking the hydrocarbon feedstock under fluidizing conditions using a particulate cracking catalyst in a reactor zone, wherein the cracking catalyst is deactivated by sulfur-containing coke deposits; passing the deactivated cracking catalyst to a regenerator zone; removing the sulfur-containing coke deposits from the deactivated cracking catalyst in the regenerator zone by burning with an oxygen-containing regeneration gas, thereby forming $SO_x$; absorbing the sulfur oxides in the regenerator zone with a fluidizable particulate $SO_x$ removing additive comprising an inorganic support, Ag and/or Cu and/or alkali metal; and removing the absorbed $SO_x$ from the particulate additive as a sulfur-containing gas comprising hydrogen sulfide in the reactor zone.

Additional objects and advantages of the present invention will become readily apparent to those skilled in the art from the following detailed description, wherein only the preferred embodiment of the invention is shown and described, simply by way of illustration of the best mode contemplated for carrying out the invention. As will be realized, the invention is capable of other and different embodiments, and its details are capable of modifications in various obvious respects, all without departing from the invention. Accordingly, the drawings and description are to be regarded as illustrative in nature, and not as restrictive.

DESCRIPTION OF THE INVENTION

The present invention stems from the discovery, after considerable research and experimentation, that Ag acts not only as an oxidation promoter under FCC regenerator conditions, but also effectively catalyzes the release of sulfur under FCC reactor conditions.

It is generally recognized that the greatest deficiency of FCC $SO_x$ additives is their limited ability to release sulfur under FCC reactor conditions. Specifically, the sulfur must be released in the reactor in a very short period of time at relativity low temperatures. Therefore, the rate at which the additive releases sulfur determines the additive's effectiveness. A new FCC $SO_x$ reducing additive has been discovered that releases sulfur an order of magnitude faster than the commercially available magnesium aluminate spinel. The active material contains copper with a stabilizing agent (e.g., MgO) and/or an alkali metal (e.g., $Li_2O$). Copper lowers the temperature at which the alkali metal sulfate can be reduced.

In another aspect of the present invention, an inorganic support, such as alumina, e.g., gamma alumina, an equilibrium catalyst, i.e., a spent FCC catalyst, magnesium aluminate, or a clay, e.g., bentonite due to its binding properties, is employed as an attrition-resistant support. A particular suitable support for use with the inventive $SO_x$ catalyst/absorbent is an FCC equilibrium catalyst (EC) which is an FCC catalyst that has been employed for FCC to the extend that its activity has been stabilized at a level below its original level. Thus, the present invention includes an efficient, attrition-resistant, particulate $SO_x$ catalyst/absorbent comprising Ag and an inorganic support having a Davison Index less than 10. The catalyst in accordance with the present invention can contain other useful catalytic components, such as $V_2O_5$ for increased absorption and rapid release of absorbed $SO_x$ in the reactor zone.

The high degree of effectiveness of Ag or Cu as not only an oxidation promoter but in catalytically releasing $SO_x$ under FCC reactor conditions was unexpected, particularly since Ag is known to be poisoned by sulfur as well as vanadium which attacks catalytic sites. The reason for the effectiveness and efficiency of Ag or Cu in the context of the present invention relating to an FCC system is not fully understood.

In another embodiment of the present invention, Ag and/or Cu is incorporated in a spinel catalyst/absorbent, such as a magnesium aluminate spinel. Accordingly, catalyst/absorbent components of the present invention include magnesium aluminate spinels, such as those disclosed in the previously mentioned Yoo et al. patents, the entire disclosures of which are incorporated herein by reference.

In a further embodiment of the present invention, a $SO_x$ catalyst/absorbent is provided with high $SO_x$ absorbtivity as well as high $SO_x$ releasability and comprises Cu in combination with an alkali metal oxide. Suitable compositional ranges include about 1 to about 15 wt. % of Cu and about 1 to about 15 wt. % of an alkali metal oxide, such as lithium oxide, sodium oxide or potassium oxide. Particularly suitable results have been achieved employing a $SO_x$ catalyst/absorbent comprising equal amounts of Cu and lithium oxide.

Advantageously, the $SO_x$ catalyst/absorbent comprising Cu can be incorporated in the $SO_x$ reducing additive disclosed in co-pending application Ser. No. 08/874,888 filed on Jun. 27, 1996. Thus, the present invention encompasses a particulate $SO_x$ catalytic/absorbent comprising Cu and an alkali metal oxide selected from the group consisting of lithium oxide ($Li_2O$), sodium oxide ($Na_2O$), potassium oxide ($K_2$) and mixtures thereof, wherein the $SO_x$ catalyst/absorbent has a bulk density of about 0.5 to about 0.9 g/cc, a particle size of about 20 to about 180 microns, and a Davison Index less than about 10. Such a $SO_x$ catalyst/absorbent can also contain $SO_x$ reducing additives, such as MgO, and $V_2O_5$. Another suitable additive comprises cerium oxide ($CeO_2$).

Another embodiment of the present invention is, therefore, a process for the cyclic fluidized catalytic cracking of a hydrocarbon feedstock containing organic sulfur compounds, which process comprises: cracking the hydrocarbon feedstock under fluidizing conditions using a particulate cracking catalyst in a reactor zone, whereby the cracking catalyst is deactivated by sulfur-containing coke deposits; passing the deactivated cracking catalyst to a regenerator zone; removing the sulfur-containing coke deposits from the deactivated cracking catalyst in the regenerator zone by burning with an oxygen containing regeneration gas, thereby forming sulfur oxides; absorbing the sulfur oxides in the regenerator zone with a fluidizable particulate sulfur oxide catalyst/absorbent additive comprising Cu and an alkali metal oxide selected from the group consisting of $Na_2O$, $Li_2O$, $K_2O$, and mixtures thereof, and removing the absorbed sulfur oxides from the sulfur oxide catalyst/absorbent as a sulfur-containing gas comprising hydrogen sulfide in the reactor zone.

In accordance with the embodiment of the present invention, a $SO_x$ catalyst/absorbent is provided containing Cu metal and an alkali metal oxide, which can be provided on an inorganic support, such as EC, alumina, e.g., gamma alumina or a clay, such as bentonite. The composition can contain an effective amount of the $SO_x$ catalyst/absorbent for $SO_x$ reduction, e.g., up to about 50% by weight. The inventive Cu-alkali metal oxide $SO_x$ catalyst/absorbent additive can advantageously be combined with other $SO_x$ reducing additives, including an $SO_x$ catalyst/absorbent, such as those containing spinels, free MgO, MgO and $V_2O_5$, or the $MgO/CeO_2/Ag$-$V_2O_5$ $SO_x$ catalyst/absorbent disclosed in copending application Ser. No. 08/874,516 filed on Jun. 13, 1997 (Our Docket No. 3012-004), the entire disclosure of which is incorporated by reference herein.

The components of the $SO_x$ catalyst/absorbent of the present invention can be formulated within compositional ranges suitable for their particular function to optimize effectiveness and efficiency in a particular situation, dependent in part upon the particular hydrocarbon feedstock cracking catalyst and FCC system. Typically, an $SO_x$ catalyst/absorbent in accordance with the present invention can comprise about 0.1 to about 10 wt. % Ag, e.g., about 1 to about 5 wt. % Ag, and/or about 1 to about 25 wt. % Cu, e.g., about 1 to about 15 wt. % Cu.

In various embodiments of the present invention, the $SO_x$ catalyst/absorbent is prepared in particulate form with physical properties consistent with the requirements for effective and efficient use in an FCC system. For example, various embodiments of the particulate $SO_x$ catalyst/absorbent of the present invention can have a bulk density of about 0.5 to about 0.9 g/cc, preferably about 0.7 to about 0.8 g/cc. Various embodiments of the particulate $SO_x$ catalyst/absorbent of the present invention can also have a particle size of about 20 to about 180 microns, preferably about 45 to about 120 microns. In addition, various embodiments of the particulate $SO_x$ catalyst/absorbent of the present invention can exhibit a Davison Index less than 10.

The $SO_x$ catalyst/absorbent of the present invention can be combined in an appropriate amount with a conventional particulate FCC cracking catalyst, such any of the various crystalline aluminosilicate zeolites, for use in an FCC system. The present invention further comprises a process for the cyclic, fluidized catalytic cracking of a hydrocarbon feedstock containing organic sulfur compounds. In the inventive process, the hydrocarbon feedstock is cracked under fluidizing conditions using a catalyst inventory comprising a particulate cracking catalyst and a particulate $SO_x$ catalyst/absorbent of the present invention in a reactor zone, wherein the cracking catalyst is deactivated by sulfur-containing coke deposits. The deactivated cracking catalyst is then transferred to a regenerator zone, wherein the sulfur-containing coke deposits on the cracking catalyst are removed with an oxygen-containing regenerating gas, thereby forming $SO_x$. Further, in accordance with the inventive process, Ag or Cu in the inventive $SO_x$ catalyst/absorbent catalyzes the reaction of $SO_2$ to $SO_3$ which is absorbed along with $SO_3$ generated during burning. The FCC catalyst inventory is then transferred to the reactor zone, wherein the absorbed $SO_x$ are effectively and rapidly released from the $SO_x$ catalyst/absorbent, catalyzed by Ag or Cu. Thus, Ag and Cu not only effectively catalyze the oxidation of $SO_2$ to $SO_3$ but also catalyze the release of $SO_x$. Typically, the temperature in the reactor zone is about 400° C. to about 700° C., while the temperature in the regenerator zone is about 565° C. to about 790° C.

A particulate $SO_x$ catalyst/absorbent of the present invention can be prepared by various methods. In one such method, the components of the inventive $SO_x$ catalyst/absorbent can be sequentially mixed, dried, calcined, ground and sieved. For example, a Ag and/or Cu salt or oxide is dissolved in water in the container. A particulate inorganic support, such as an EC or alumina, e.g., microspheres of alumina, is then dispersed in the solution to form a slurry which is stirred until homogeneous. The slurry is then dried in an oven at about 120° C. until weight loss is negligible. The resulting solids are then calcined in a furnace to about 700° C. for about one hour. The resulting material is then ground and sieved to retain an average particle size of about 78 microns. In another preparation technique, the slurry is preferably spray dried to obtain spherically shaped particles with an average particle size of about 78 microns, to reduce the number of processing steps. Another method of preparing a particulate $SO_x$ catalyst/absorbent of the present invention comprises impregnating a support, such as alumina with the active ingredients. The amount of solution employed should be that amount which completely fills the pores of the support. After calcination, metal oxides remain.

EXAMPLES

All samples were dried at 140° C. before being evaluated in the TGA. Oxidizing conditions were at 700° C. under 100 cc/min of 2% $O_2$ and 2,000 ppm $SO_2$ at which time a weight gain was measured. The sample was then cooled to 250° C. under $N_2$. A gas mixture containing 5% $H_2$ and 95% $N_2$ was then passed over the sample as the temperature was increased 10° C./min at which time a weight loss was measured.

Example 1

Procedure: 0.114 grams of $AgNO_3$ was dissolved in 0.57 grams of water. Solution used to impregnate 0.927 grams of Condea alumina.

Final composition: 7% Ag 93% $Al_2O_3$.

Results: Pickup 2.4%, released all before reaching 360° C.

Conclusion: Release occurs below 250° C., after four cycles no sign of deactivation.

Example 2

Procedure: 0.08 grams of $AgNO_3$ and 3.49 grams of $Al(NO_3)_3$* $9H_2O$ were dissolved in 7 grams of water and then dried at 140° C.

Final composition: 5% Ag 95% $Al_2O_3$.

Results: Pickup 3% after 30 minutes.

Conclusion: Poor mass transfer due to low porosity or inability of composition to pickup $SO_x$ caused slow rate and low capacity under these testing conditions.

Example 3

Procedure: 0.08 grams of $AgNO_3$ was dissolved in 0.5 grams of water and used to impregnate 1 gram of magnesium aluminate spinel.

Final composition: 5% Ag 95% magnesium aluminate spinel.

Results: Pickup 8%/6 minutes, release 0.3% @ 500° C., 2.4% @ 550° C. and 6% @ 600° C.

Conclusion: Capacity the same but release improved by a factor of two at 550° C. compared to magnesium aluminate spinel without silver.

Example 4

Procedure: 0.16 grams of $AgNO_3$ and 2.74 grams of $NaNO_3$ were dissolved in 2.5 grams of hot water. This solution was used to impregnate 3.9 grams of Condea alumina.

Final composition: 2% Ag 20% $Na_2O$ 78% $Al_2O_3$.

Results: Pickup 12.5%, release 0.3% @ 575° C. and 0.5% @ 600° C.

Conclusion: The presence of large amounts of soda reduces the effectiveness of silver.

Example 5

Procedure: 2.02 of $Al_2(SO_4)_3$* $18H_2O$ was ground and sieved to 180–40 $\mu$. 0.021 grams of $AgNO_3$ was dissolved in 0.5 grams of water. This solution was used to impregnate the $Al_2(SO_4)_3$. Slurry was dried at 140° C.

Final composition: 2% Ag 98% $Al_2O_3$.

Results: Pickup 91%, release 16% @ 600° C., not fully reduced. After second cycle pickup 2% temperature sensitive, release not stable in $N_2$.

Conclusion: Silver alumina formulation does not form stable sulfates at 700° C.

Example 6

Procedure: A solution was prepared containing 0.078 grams $AgNO_3$, 0.19 grams $Cu(NO_3)_2$* $3H_2O$, 0.177 grams $Mn(NO_3)_2$* $4H_2O$ in 2.25 grams of water. Solution was used to impregnate 6 grams of catalyst containing 20% MgO.

Final composition: 1% Ag 1% Cu 1% MnO 97% catalyst support.

Results: Pickup 50%, release 1 peak at 430° C. broad to 600° C., release 3.7% @ 550° C. and 4.2% @ 600° C.

Conclusion: Shotgun experiment demonstrates a material can be made with the ability to release $SO_x$ four times faster than magnesium aluminate spinel at 550° C.

Example 7

Procedure: A solution containing 1.3 grams $Al_2(SO_4)_3$* $18H_2O$ was used to impregnate 1.84 gams Condea alumina. Then a solution containing a 0.063 grams $AgNO_3$ was used to impregnate the alumina.

Final composition: 2% Ag 98% $Al_2O_3$.

Results: Pickup 0.8%, release not stable in $N_2$.

Conclusion: Silver alumina formulation does not form stable sulfates at 700° C.

Example 8

Procedure: 0.76 grams of $Cu(NO_3)_2$* $3H_2O$ was dissolved in 0.5 grams of water. This solution was used to impregnate 1.8 grams of Condea alumina.

Final composition: 10% Cu 90% $Al_2O_3$.

Results: Pickup 3.4%, release 2 peaks @ 275° C. and 303° C., broad peak at 378° C., release 4.2% @ 550° C. and 4.5% @ 600° C.

Conclusion: Copper alumina performs better than silver alumina and should outperform magnesium aluminate spinel by a factor of four.

Example 9

Procedure: 2.66 grams of $Cu(NO_3)_2$* $3H_2O$ and 7.34 grams of $Al_2(SO_4)_3$* $18H_2O$ were dissolved in water and dried at 140° C.

Final composition: 44% Cu 56% $Al_2O_3$.

Results: No pickup except at lower temperatures.

Conclusion: Copper alumina formulation does not form stable sulfates at 700° C.

Example 10

Procedure: 4.03 grams of $Cu(NO_3)_2$* $2H_2O$ and 2.01 grams of $MgSO_4$ were dissolved in water and dried at 140° C.

Final composition: 66% Cu 34% MgO.

Results: Reduced first, second cycle pickup 25%, release at 430° C., release 10.3% @ 550° C. and 10.8% @ 600° C., third cycle pickup 15% release at 490° C.

Conclusion: Suspect synergistic effects at optimum copper MgO ratio.

Example 11

Procedure: 0.45 grams of Example 10 were calcined at 760° C. before impregnating with 0.2 grams of $Ce(NO_3)_3$ solution containing 36.9% $CeO_2$.

Final composition: 57% Cu 13% $CeO_2$ 29% MgO.

Results: Pickup 25% sensitive to temperature, release @ 476° C. release 13.3% @ 550° C. and 15.6% @ 600° C., second cycle pickup 23%, release 423° C.

Conclusion: The addition of $CeO_2$ to Example 10 improves $SO_x$ release characteristics.

Example 12

Procedure: 0.19 grams of $Cu(NO_3)_2$* $3H_2O$ was dissolved in 0.4 grams of water. Solution used to impregnate 1 gram of catalyst containing 20% MgO.

Final composition: 5% Cu 95% catalyst support.

Results: Pickup 48%, release 0.25% @ 550° C. and 0.6% @ 600° C.

Conclusion: Catalyst support also contained a large amount of potash which could have poisoned the activity of the copper.

Example 13

Procedure: 0.78 grams of $AgNO_3$, 0.19 grams of $Cu(NO_3)_2$* $3H_2O$ and 0.177 grams of $Mn(NO_3)_2$* $4H_2O$ were dissolved in 0.4 grams of water. Solution used to impregnate 0.85 grams of equilibrium catalyst.

Final composition: 5% Ag 5% Cu 5% MnO 85% EC.

Results: Pickup 4.8%, all released 3% @ 409° C. and 2.8% @ 590° C.

Conclusion: Results similar to Example 6 and shows that additional metals did not result in improved results possibly because of difference in supports. Peak at 409° C. probably due to copper and peak at 590° C. due to MnO.

Example 14

Procedure: 0.078 grams of $AgNO_3$ and 0.19 grams of $Cu(NO_3)_2$* $3H_2O$ were dissolved in 0.4 grams of water. Solution used to impregnate 0.9 grams of equilibrium catalyst.

Final composition: 5% Ag 5% Cu 90% EC.

Results: Pickup 1.8%, release 0.38% @ 300° C. and 0.96% @ 360° C.

Conclusion: Poor performance probably due to negative interaction between silver and copper or because a necessary stabilizing agent (e.g., MgO, MnO, or $CeO_2$) is absent from the formulation.

Example 15

Procedure: 0.354 grams of $Mn(NO_3)_2 * 4H_2O$ and 0.078 grams of $AgNO_3$ were dissolved in 0.4 grams of water. Solution used to impregnate 0.90 of equilibrium catalyst.

Final composition: 5% Ag 10% MnO 85% EC.

Results: Pickup 6%, release 3.4% @ 594° C. not stable in $N_2$.

Conclusion: Pickup and release probably due to MnO. Silver causes sulfates formed to be unstable.

Example 16

Procedure: 0.354 grams of $Mn(NO_3)_2 * 4H_2O$ and 0.19 grams of $Cu(NO_3)_2 * 3H_2O$ were dissolved in 0.4 grams of water. Solution used to impregnate 0.9 grams of equilibrium catalyst.

Final composition: 5% Cu 10% MnO 85% EC.

Results: Pickup 7.6%, released all 1.76% @ 432° C. and 4.2% @ 597° C.

Conclusion: Most of pickup and release at 597° C. due to MnO. MnO not very effective as a stabilizing agent for copper.

Example 17

Procedure: 0.76 grams of $Cu(NO_3)_2 * 3H_2O$ was dissolved in 0.266 grams of water and used to impregnate 0.84 grams of equilibrium catalyst.

Final composition: 20% Cu 80% EC.

Results: Pickup 1.1% more at lower temperature, all released.

Conclusion: Copper does not form stable sulfates at 700° C., need a stabilizing agent.

Example 18

Procedure: 0.76 grams of $Cu(NO_3)_2 * 3H_2O$ and 0.64 grams of $Mg(NO_3)_2 * 6H_2O$ were dissolved in 0.324 grams of water and used to impregnate 0.74 grams of equilibrium catalyst.

Final composition: 20% Cu 10 MgO 70% EC.

Results: Pickup 12%, release 2% @ 460° C., 4% @ 484° C. and 6% @ 600° C.

Conclusion: As also shown in Example 10 copper with a stabilizing agent gives excellent results.

Example 19

Procedure: 0.76 grams of $Cu(NO_3)_2 * 3H_2O$ and 0.177 grams of $Mn(NO_3)_2 * 4H_2O$ were dissolved in 0.255 grams of water and used to impregnate 0.74 grams of equilibrium catalyst.

Final composition: 20% Cu 10 MnO 70% EC.

Results: Pickup 8.6%, release 2% at low temperature.

Conclusion: MnO is not as good of stabilizing agent as MgO.

Example 20

Procedure: 0.38 grams of $Cu(NO_3)_2 * 3H_2O$ and 0.64 grams of $Mg(NO_3)_2 * 6H_2O$ were dissolved in 0.42 grams of water. Impregnation of 0.84 grams of support containing 20% MgO occurred over several cycles.

Final composition: 10% Cu 10% MgO 80% catalyst support.

Results: Pickup 21%, release 2% @ 550° C. and 5% @ 600° C.

Conclusion: Although the MgO content is the same as in Example 18 performance is reduced because of lower copper content. This demonstrates the optimum copper to MgO ratio is greater than two.

Example 21

Procedure: 0.38 grams of $Cu(NO_3)_2 * 3H_2O$ and 0.64 grams of $Mg(NO_3)_2 * 6H_2O$ were dissolved in 0.42 grams of water. 0.84 grams of magnesium aluminate spinel was impregnated with this solution over several cycles.

Final composition: 10% Cu 10% MgO 80% magnesium aluminate spinel.

Results: Pickup 47%/80 minutes, release 4% @ 550° C. and 7% @ 600° C.

Conclusion: The properties of magnesium aluminate spinel can be greatly enhanced through the addition of copper and MgO by a factor of four or twice that of Example 3.

Example 22

Procedure: 0.079 grams of $AgNO_3$ and 0.145 grams of $Ce(NO_3)_3$ (36.9% $CeO_2$) were dissolved in 0.3 grams of water and used to impregnate 0.9 grams of Condea alumina.

Final composition: 5% Ag 5% $CeO_2$ 90% $Al_2O_3$.

Results: Pickup 3.5% sensitive to temperature, release 1% @ 300° C.

Conclusion: Combination of Ag and $CeO_2$ did not produce anticipated results of greater pickup and release (combining Example 1 and Additive R). Also, less than Example 13, therefore MnO was important.

Example 23

Procedure: 0.38 grams of $Cu(NO_3)_2 * 3H_2O$ and 0.0725 grams of $Ce(NO_3)_3$ (36.9% $CeO_2$) were dissolved in 0.385 grams of water. Solution was used to impregnate 0.92 grams of equilibrium catalyst.

Final composition: 10% Cu 2.5% $CeO_2$ 87.5% EC.

Results: Pickup 1.3% @ 700° C. 3.4% @ 590° C., released all by @ 500° C.

Conclusion: $CeO_2$ does not stabilize Cu as indicated by $SO_x$ pickup sensitivity to temperature.

Example 24

Procedure: 0.38 grams of $Cu(NO_3)_2 * 3H_2O$, 0.32 grams of $Mg(NO_3)_2 * 6H_2O$, and 0.0725 grams of $Ce(NO_3)_3$ (36.9% $CeO_2$) were dissolved in 0.28 grams of water. Solution was used to impregnate 0.87 grams of equilibrium catalyst.

Final composition: 10% Cu 5% MgO 2.5% $CeO_2$ 82.7% EC.

Results: Pickup 3.7% @ 700° C., released all start @ 425° C. and peak @ 490° C.

Conclusion: The addition of MgO reduced $SO_x$ pickup sensitivity to temperature compared to Example 23.

Example 25

Procedure: 0.38 grams of $Cu(NO_3)_2 * 3H_2O$ and 0.32 grams of $Mg(NO_3)_2 * 6H_2O$ were dissolved in 0.334 grams of water. Solution was used to impregnate 0.85 grams of catalyst support.

Final composition: 10% Cu 5% MgO 85% CS.

Results: Pickup 1.7%, released all below @ 525° C.

Conclusion: Type of catalyst support is important for performance.

Example 26

Procedure: 0.388 grams of $Co(NO_3)_2 * 6H_2O$ and 0.383 grams of $Cu(NO_3)_2 * 3H_2O$ were dissolved in 0.35 grams of water. This solution was used to impregnate 0.842 grams of equilibrium catalyst.

Final composition: 10% CoO 10% Cu 80% EC.

Results: Pickup 1.2% @ 700° C., +1.7% @ 690° C., +0.8% @ 680° C., $SO_x$ pickup very sensitive to temperature, release 2 peaks @ 470° C. (Cu) and @ 550° C. (CoO).

Conclusion: Cu and CoO probably work independently.

Example 27

Procedure: 0.388 grams of $Co(NO_3)_2 * 6H_2O$ and 0.383 grams of $Cu (NO_3)_2 * 3H_2O$ and 0.32 grams of $Mg (NO_3)_2 * 6H_2O$ were dissolved in 0.328 grams of water. This solution was used to impregnate 0.79 grams of equilibrium catalyst.

Final composition: 10% CoO 10% Cu 5% MgO 75% EC.

Results: Pickup 14.5% second cycle, release start @ 350° C. 2 peaks @ 460° C. (Cu) and @ 570° C. (CoO) , 4% @ 550° C. and 6% @ 600° C.

Conclusion: The addition of MgO greatly improved the performance over Example 26.

Example 28

Procedure: 0.383 grams of $Cu(NO_3)_2 * 3H_2O$ and 0.324 grams of $KNO_3$ were dissolved in 0.319 grams of water.

This solution was used to impregnate 0.79 grams of equilibrium catalyst.

Final composition: 10% Cu 15% $K_2O$ 75% EC.

Results: Pickup 13.0%/minutes, release was $H_2$ rate limiting start @ 375° C. peak very broad second cycle start release @ 325° C. peak @ 470° C., 5.9% @ 500° C., 7.7% @ 550° C. and 8.9% @ 600° C.

Conclusion: Results greatly improved over Example 17 and are synergistic. Copper and potash may form a double salt and/or copper lowers the temperature at which $K_2SO_4$ decomposes in a reducing atmosphere.

Example 29

Procedure: 0.388 grams of $Co(NO_3)_2 * 6H_2O$ and 0.274 grams of $KNO_3$ were dissolved in 0.353 grams of water. This solution was used to impregnate 0. 816 grams of equilibrium catalyst.

Final composition: 10% CoO 12.5% $K_2O$ 77.5% EC.

Results: Pickup 8.6%/20 minutes $SO_x$ pickup sensitive to temperature, released start @ 320° C. and peak @ 430° C. (CoO) and @ 590° C. ($K_2O$), 1.6% @ 550° C. and 2.6% @ 600° C.

Conclusion: Results with CoO not as good as Cu Example 28. CoO and $K_2O$ may work independently.

Example 30

Procedure: 0.383 grams of $Cu(NO_3)_2 * 3H_2O$ and 0.22 grams of $LiNO_3$ were dissolved in 0.45 grams of water. This solution was used to impregnate 0.9 grams of equilibrium catalyst.

Final composition: 10% Cu 5% $Li_2O$ 85% EC.

Results: Pickup 7.7% @ 700° C. +6.1% @ 530° C., release start <@ 350° C. peak @ 455° C., 9.5% @ 500° C., 11.8% @ 550° C., and 13.1% @ 600° C.

Conclusion: Pickup okay but sensitive to temperature. Compare to Example 28 mole ratio of alkali to copper the same so pickup as expected. Release much improved as expected since decomposition temperature of $Li_2SO_4$ is <that of $K_2SO_4$.

Example 31

Procedure: 0.383 grams of $Cu(NO_3)_2 * 3H_2O$ and 0.27 grams of $NaNO_3$ were dissolved in 0.65 grams of water. This solution was used to impregnate 0.84 grams of equilibrium catalyst.

Final composition: 10% Cu 10% $Na_2O$ 80% EC.

Results: Pickup 9.5% not sensitive to temperature, release very broad start @ 320° C. peak @ 530° C., 4.5% @ 550° C., and 6% @ 600° C.

Conclusion: Compare to Example 30 mole ratio of alkali to copper the same so pickup as expected. Release worse than Example 30 because $Na_2SO_4$ is more stable.

Example 32

Procedure: 0.1 grams of $Cu(NO_3)_2 * 3H_2O$ and 0.44 gams of $LiNO_3$ were dissolved in 0.55 grams of water. Solution was used to impregnate 0.92 grams of equilibrium catalyst.

Final composition: 2.5% Cu 10% $Li_2O$ 87.5% EC.

Results: Pickup 9.9% not sensitive to temperature, release start @ 375° C. peak @ 591° C., 0.6% @ 500° C., and 1.4% @ 550° C. and 3.35% @ 600° C.

Conclusion: The optimum ratio (balance between pickup sensitivity to temperature and quick release) of Cu to $Li_2O$ is between this example and Example 30.

Discussion

7% silver on Condea alumina (Example 1) releases sulfur at about twice the rate magnesium aluminate spinel at 550° C. Copper was investigated because of its lower cost relative to silver and because it is reduced to metal (rather than sulfide) under FCC reactor conditions.

Example 8 (copper on Condea alumina) outperforms Example 1 (silver on Condea alumina). With a stabilizing agent copper gives outstanding results (Examples 6, 10, 11, 13, 18, 20, 21 and 27). Even the performance of the industry standard magnesium aluminate spinel can be greatly improved through the incorporation of silver (Example 3) or copper and MgO (Example 21), or both silver and copper.

Copper also lowers the temperature at which alkali metal sulfates are reduced in the presence of hydrogen. On a mole basis 15% $K_2O$, 10% $Na_2O$, and 5% $Li_2O$ are nearly equivalent and with 10% copper their $SO_x$ pickup is similar Examples 28, 30 and 31. Under typical FCC reactor conditions the formulation in Example 31 ($Na_2O$), Example 28 ($K_2O$), and Example 30 ($Li_2O$) outperform magnesium aluminate spinel in terms of release by 4.5, 7.5 and 12 times, respectively. The addition of MgO to the formulation enhances the performance of both pickup and release by stabilizing the copper.

In embodiments of the present invention, stabilizing agents are added to enhance the desirable properties of compositions comprising silver and copper. In general, other Group IIA oxides can be added as stabilizing agents, e.g., calcium incorporated as calcium oxide. Silver with the proper stabilizing agent demonstrates properties similar to copper. Materials containing MnO, CoO, ZnO, $Fe_2O_3$, or other transition metal oxides form sulfides as a portion of their composition under reducing conditions. The presence of copper or silver shifts the reducing products to oxides, thereby releasing sulfur.

The general formulation of this invention contains a Group IB metal capable of oxidizing $SO_2$ and forming a sulfate under FCC regenerator conditions. The preferred metal is silver and/or copper. Particularly useful $SO_x$ catalyst absorbent compositions comprise Cu and an alkali metal oxide. The formulation may also contain a Group IIA metal oxide to stabilize the Group IB metal. The preferred metal oxide is MgO. The formulation may also contain a transition metal oxide to increase the pickup and release capacity. The preferred transition metal oxide is CoO. The formulation may also contain a Group IA alkali earth metal oxide to increase the pickup and release capacity. The preferred metal oxide is $Li_2O$.

The $SO_x$ catalyst/absorbent of the present invention enjoys utility in various applications wherein $SO_x$ reduction is desired, but has particular utility in an FCC environment for absorbing $SO_x$ as $SO_3$ in the regenerator zone and releasing absorbed $SO_x$ in the reactor zone of an FCC system. The inventive $SO_x$ catalyst can, therefore, be used in any of various FCC systems as part of the catalyst inventory together with any of various conventional FCC cracking catalysts, including aluminosilicate zeolites.

What is claimed is:

1. A process for the cyclic fluidized catalytic cracking of a hydrocarbon feedstock containing organic sulfur compounds, which process comprises:

cracking the hydrocarbon feedstock under fluidizing conditions using a particulate cracking catalyst in a reactor zone, whereby the cracking catalyst is deactivated by sulfur-containing coke deposits;

passing the deactivated cracking catalyst to a regenerator zone;

removing the sulfur-containing coke deposits from the deactivated cracking catalyst in the regenerator zone by burning with an oxygen containing regeneration gas, thereby forming sulfur oxides;

absorbing the sulfur oxides in the regenerator zone with a fluidizable particulate sulfur oxide catalyst/absorbent additive comprising about 5 to about 15 wt. % of copper (Cu) and about 5 to about 25 wt. % of lithium oxide; and removing the absorbed sulfur oxide from the particulate sulfur oxide-reducing additive as a sulfur-containing gas comprising hydrogen sulfide in the reactor zone.

2. The process according to claim 1, wherein the Cu lowers the reduction temperature of alkali metal sulfate to release the sulfur oxide in the presence of hydrogen as hydrogen sulfide.

3. The process according to claim 1, wherein the particulate sulfur oxide reducing additive has a bulk density of about 0.5 to about 0.9 g/cc, a particle size of about 20 to about 180 microns and a Davison Index less than 10.

4. The process according to claim 1, wherein the sulfur oxide catalyst/absorbent additive comprises an inorganic support.

5. The process according to claim 4, wherein the inorganic support comprises an alumina or an equilibrium catalyst.

6. The process according to claim 1, wherein the sulfur oxide catalyst/absorbent additive further comprises MgO and/or $V_2O_5$.

7. The process according to claim 1, wherein the sulfur oxide reducing additive further comprises $CeO_2$ and/or Ag.

8. The process according to claim 1, wherein the $SO_x$ catalyst/absorbent comprises about equal amounts of Cu and lithium.

9. The process according to claim 1, wherein the sulfur oxide catalyst/absorbent additive further comprises a magnesium aluminate spinel.

10. The process according to claim 5, wherein the inorganic support comprises an equilibrium catalyst.

11. The process according to claim 1, wherein the sulfur oxide catalyst/absorbent additive comprises about 10 wt. % Cu, about 5 wt.% lithium oxide and about 86 wt. % of an equilibrium catalyst.

* * * * *